United States Patent
Kita et al.

(10) Patent No.: US 8,800,279 B2
(45) Date of Patent: Aug. 12, 2014

(54) HYDRAULIC TRANSMISSION SYSTEM FOR ZERO-TURN VEHICLE

(75) Inventors: Tsuyoshi Kita, Amagasaki (JP); Koji Iwaki, Amagasaki (JP); Shinya Sakakura, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 504 days.

(21) Appl. No.: 13/272,917

(22) Filed: Oct. 13, 2011

(65) Prior Publication Data
US 2013/0091837 A1    Apr. 18, 2013

(51) Int. Cl.
*F16D 31/02*    (2006.01)

(52) U.S. Cl.
USPC ............................................. 60/488

(58) Field of Classification Search
USPC ............... 60/487, 488; 180/6.48, 307, 308
See application file for complete search history.

(56) References Cited

U.S. PATENT DOCUMENTS

| | | | | |
|---|---|---|---|---|
| 7,654,083 | B2* | 2/2010 | Iida et al. | 60/487 |
| 7,934,578 | B2* | 5/2011 | Ohashi et al. | 180/307 |
| 8,112,991 | B1* | 2/2012 | Iida et al. | 60/488 |
| 8,220,257 | B2* | 7/2012 | Iida et al. | 60/487 |
| 8,250,862 | B1* | 8/2012 | Iida et al. | 60/487 |
| 8,336,306 | B2* | 12/2012 | Hardzinski et al. | 60/488 |
| 2009/0301076 | A1 | 12/2009 | Yasuda et al. | |
| 2011/0162355 | A1 | 7/2011 | Hardzinski | |

* cited by examiner

*Primary Examiner* — Michael Leslie
(74) *Attorney, Agent, or Firm* — Sterne, Kessler, Goldstein & Fox P.L.L.C.

(57) ABSTRACT

A hydraulic transmission system for a zero-turn vehicle, comprises first and second transaxles each of which includes an axle, a casing supporting the axle, a fluid sump provided in the casing, first and second ports provided on the casing and opened outward from the casing, an HST circuit, a charge pump disposed in the casing, and a charge passage disposed in the casing to supply the HST circuit with fluid delivered from the charge pump. A first pipe connects the first ports of the transaxles, thereby making the flow of fluid from the charge pump of the first transaxle to the fluid sump of the second transaxle. A second pipe connects the second ports of the transaxles, whereby overflowing fluid of the fluid sump of the second transaxle is released to the fluid sump of the first transaxle via the second pipe.

10 Claims, 5 Drawing Sheets

HYDRAULIC TRANSMISSION SYSTEM FOR ZERO-TURN VEHICLE

BACKGROUND OF THE INVENTION

1. Field of the Invention

The present invention relates to a hydraulic transmission system that includes right and left hydrostatic transaxles supporting respective right and left axles so as to be applicable to a zero-turn vehicle, such as a lawn mower.

2. Related Art

US 2009/0301076 A1 teaches a lawn mower, serving as a typical zero-turn working vehicle, which is equipped with a hydraulic transmission system including right and left hydrostatic transaxles (integral hydrostatic transaxles, i.e., "IHT"s) supporting respective right and left axles, so that the right and left transaxles are available to differentially control the right and left axles, thereby enabling zero-turn of the vehicle. Each of the transaxles includes a casing that incorporates a hydrostatic stepless transmission (HST) and supports the corresponding axle. The HST includes a hydraulic pump, a hydraulic motor for driving the corresponding axle, a hydraulic circuit (HST circuit) fluidly connecting the hydraulic pump to the hydraulic motor, and a charge system for charging fluid to the HST circuit. The charge system includes a charge pump and charge check valves.

In the above-mentioned conventional hydraulic transmission system for a zero-turn vehicle, the casing of each transaxle has a pair of ports. One port is used for extracting fluid delivered from the charge pump to a hydraulic implement, such as a hydraulic cylinder for lifting a mower unit, disposed outside of the casing, and the other port is used for introducing fluid from the hydraulic implement to the charge check valves, thereby charging fluid to the HST circuit via one of the charge check valves.

The main reason why the casing of each transaxle has the pair of ports for extracting fluid to the outside of the casing and for returning fluid to the inside of the casing is to effectively cool the fluid while the fluid flows in pipes that are extended outward from the casing to connect the ports to the hydraulic implement. However, the pipes must be expensive high pressure pipes, such as metal pipes.

US 2011/0162355 A1 (hereinafter referred to as the '355 reference) also teaches a hydraulic transmission system for a zero-turn vehicle, including right and left transaxles (IHTs). In this system, a pipe is interposed between ports on the upper portions of casings of the respective right and left transaxles, and an external reservoir tank is provided on an intermediate portion of the pipe. In other words, the external reservoir tank divides the pipe into portions connected to the respective ports, while another pipe is interposed between low portions, e.g., oil pans, of the casings of the respective right and left transaxles. The pipe interposed between the ports on the upper portions of the casings of the right and left transaxles can be made of a cheap low pressure pipe, e.g., a rubber hose, because it has to bear against only a low pressure of fluid overflowing from the casing of either the right or left transaxle or only a low pressure of fluid flowing from the external reservoir tank to the casing of either the right or left transaxle caused by hydraulic depression of a fluid sump in this casing. On the other hand, the pipe interposed between the ports on the lower portions of the casings of the right and left transaxles must be an expensive high pressure pipe because it must bear against forcible flow of hydraulic fluid from one casing to the other casing. However, due to the above-mentioned low pressure pipe for allowing fluid to overflow from one transaxle to the other transaxle, the high pressure pipe can be reduced in number so as to reduce costs.

The '355 reference discloses some embodiments of the high pressure pipe between lower portions of the right and left transaxles. In one embodiment (FIG. 6), a charge pressure regulation valve is disposed in a casing of one transaxle (referred to as a first transaxle) so as to be connected to a charge passage interposed between a charge pump and charge check valves, thereby supplying the charge check valves with fluid having a pressure regulated by the charge pressure regulation valve. In this regard, in the casing of the first transaxle, a relief passage branches from the charge passage and extends to the port connected to the high pressure pipe, and the charge pressure regulation valve is disposed on the relief passage so as to release fluid to the port connected to the high pressure pipe and so as to drain the released fluid to a fluid sump of the other transaxle (referred to as a second transaxle). Therefore, part of the fluid released from the charge pressure regulation valve in the first transaxle is drained via the high pressure pipe to the fluid sump in the second transaxle, so as to increase the volume of the fluid sump in the second transaxle, whereby fluid of the fluid sump in the second transaxle overflows to the external reservoir tank via one portion of the low pressure pipe, and is introduced from the external reservoir tank to the fluid sump of the first transaxle via the other portion of the low pressure pipe by hydraulic depression of the fluid sump of the first transaxle, thereby circulating hydraulic fluid between the first and second transaxles so as to radiate heat from the hydraulic fluid while flowing in the high and low pressure pipes.

Further, in the casing of the first transaxle, a drain passage branches from the relief passage at a downstream side of the charge pressure regulation valve and extends to a fluid sump of the first transaxle so as to drain surplus fluid from the relief passage to the fluid sump of the first transaxle. In this embodiment, a hydraulic actuator is disposed on an intermediate portion of the high pressure pipe between the ports on the lower portions of the casings of the first and second transaxles, so that the flow of fluid in the high pressure pipe from the port of the first transaxle to the port of the second transaxle must pass through the hydraulic actuator. In particular, the above-mentioned drain passage in the casing of the first transaxle is intended to drain fluid having backpressure from the hydraulic actuator when the moved hydraulic actuator reaches a limit position of its movement. However, it seems that, regardless of whether or not the hydraulic actuator reaches the limit position, fluid released from the charge pressure regulation valve in the first transaxle is liable to flow into the drain passage in the first transaxle rather than to flow into the high pressure pipe having the hydraulic actuator resisting the flow of fluid in the high pressure pipe, so that the flow of fluid in the high pressure pipe may be insufficient to smoothly operate the hydraulic actuator and to cool the entire hydraulic transmission system as expected. No other embodiment in the '355 reference teaches how to solve this problem.

Further, in some other embodiments (FIGS. 3 and 4) of the '355 reference, the ports with the high pressure pipe therebetween are fluidly connected to fluid sumps in the respective casings. The high pressure pipe is provided on an intermediate portion thereof with no hydraulic actuator, however, with an additional charge pump to make sure fluid flows from one transaxle to the other transaxle, thereby increasing costs.

BRIEF SUMMARY OF THE INVENTION

A hydraulic transmission system for a zero-turn vehicle according to the present invention comprises first and second transaxles, first and second pipes, a charge pressure regulation valve, and a drain passage. Each of the first and second transaxles includes an axle, a casing, a fluid sump, first and second ports, a hydraulic motor, a hydraulic pump, a hydraulic circuit, a charge pump, and a charge passage. In each of the first and second transaxles, the casing supports the axle, the fluid sump is provided in the casing, the first and second ports are provided on the casing and are opened outward from the casing, the hydraulic motor is provided for driving the axle, the hydraulic pump is provided for delivering fluid to the hydraulic motor, the hydraulic circuit is disposed in the casing to fluidly connect the hydraulic pump to the hydraulic motor, the charge pump is disposed in the casing so as to suck fluid from the fluid sump and so as to deliver fluid to be charged to the hydraulic circuit, and the charge passage is disposed in the casing so as to supply the hydraulic circuit with fluid delivered from the charge pump. The charge pressure regulation valve is disposed in the casing of the first transaxle and is connected to the charge passage of the first transaxle so as to regulate a pressure of fluid in the charge passage of the first transaxle. The first pipe is disposed outside of the casings of the first and second transaxles so as to connect the first ports of the respective first and second transaxles to each other. The drain passage is disposed in the casing of the second transaxle so as to connect the first port of the second transaxle to the fluid sump of the second transaxle. The second pipe is disposed outside of the casings of the first and second transaxles so as to connect the second ports of the respective first and second transaxles to each other, whereby overflowing fluid of the fluid sump of the second transaxle is released to the fluid sump of the first transaxle via the second pipe.

An object of the invention is to provide an effective and economical hydraulic fluid circulation system for cooling the hydraulic transmission system, which especially needs no additional charge pump for making the flow of fluid from one transaxle to the other transaxle, wherein even if the hydraulic fluid circulation system is utilized for operating a hydraulic actuator, the expected efficiency of cooling the entire hydraulic transmission system by the cooling system can be kept while ensuring expectedly smooth operability of the hydraulic actuator.

To achieve this object, in the hydraulic transmission system according to a first aspect of the invention, the first transaxle is configured so that fluid released from the charge pressure regulation valve is fully supplied to the first port of the first transaxle without branching, whereby part of the fluid flowing in the charge passage of the first transaxle is drained to the fluid sump of the second transaxle via the charge pressure regulation valve, the first pipe and the drain passage.

Therefore, part of the fluid delivered from the charge pump of the first transaxle is supplied to the charge pressure regulation valve, and the fluid released from the charge pressure regulation valve is fully supplied to the first pipe without branching, thereby efficiently cooling the entire hydraulic transmission system with no additional charge pump increasing costs. Further, if the first pipe is provided on any intermediate portion thereof with no hydraulic actuator resisting the flow of fluid in the first pipe, the first pipe further surely makes the flow of fluid therein from the first port of the transaxle to the first port of the second transaxle.

Preferably, in the first aspect, the hydraulic transmission system further comprises an external reservoir tank disposed on an intermediate portion of the second pipe.

Therefore, the external reservoir tank absorbs fluid from the overflowing fluid sump of the second transaxle so as to keep the required volume of the fluid sump of the second transaxle while driving the hydraulic pump of the second transaxle, and supplies fluid to the hydraulically depressed fluid sump of the first transaxle so as to keep the required volume of the fluid sump of the first transaxle while driving the hydraulic pump of the first transaxle.

Preferably, in the first aspect, the hydraulic transmission system further comprises third and fourth ports, a hydraulic actuator, third and fourth pipes, a switching valve, an actuator pressure regulation valve, a fluid extraction passage, and a fluid returning passage. The third and fourth ports are provided on the casing of the second transaxle and are opened outward from the casing of the second transaxle. The hydraulic actuator is disposed outside of the casing of the second transaxle. The third pipe is disposed outside of the casing of the second transaxle so as to connect the third port to the hydraulic actuator and so as to lead fluid supplied to the hydraulic actuator. The fourth pipe is disposed outside of the casing of the second transaxle so as to connect the fourth port to the hydraulic actuator and so as to lead fluid discharged from the hydraulic actuator. The switching valve is interposed between the third and fourth pipes so as to be shiftable for selecting whether or not fluid delivered from the charge pump of the second transaxle is supplied to the hydraulic actuator. The actuator pressure regulation valve is disposed on an intermediate portion of the charge passage of the second transaxle. The fluid extraction passage is disposed in the casing of the second transaxle so as to be interposed between a portion of the charge passage of the second transaxle at an upstream side of the actuator pressure regulation valve and the third port, whereby part of the fluid delivered from the charge pump of the second transaxle before passing the actuator pressure regulation valve is supplied to the hydraulic actuator via the fluid extraction passage and the third pipe. The fluid returning passage is disposed in the casing of the second transaxle so as to be interposed between a portion of the charge passage of the second transaxle at a downstream side of the actuator pressure regulation valve and the fourth port, whereby fluid discharged from the hydraulic actuator is returned via the fourth pipe and the fluid returning passage so as to be joined with fluid in the charge passage of the second transaxle after passing the actuator pressure regulation valve.

Therefore, the hydraulic actuator does not interrupt the flow of fluid in the first pipe, thereby further ensuring the sufficient flow of fluid in the first pipe for cooling the entire hydraulic transmission system. The operation of the hydraulic actuator is prevented from causing loss of hydraulic fluid because it can use overflowing fluid of the fluid sump of the second transaxle that is liable to overflow because fluid delivered from the charge pump of the second transaxle as well as fluid delivered from the charge pump of the first transaxle via the first pipe is drained to the fluid sump of the second transaxle. Further, if the operated hydraulic actuator reaches its limit position so as to interrupt the flow of fluid therethrough from the third pipe to the fourth pipe, the actuator pressure regulation valve regulates the pressure of fluid in the charge passage at the downstream side thereof in response to an unexpected hydraulic pressure applied from the third port to the fluid extraction passage according to the interruption of the flow of fluid between the third and fourth pipes.

Alternatively, to achieve the object, in the hydraulic transmission system according to a second aspect of the invention, the charge pressure regulation valve is referred to as a first charge pressure regulation valve, and is configured so that fluid released from the first charge pressure regulation valve is drained to the fluid sump of the first transaxle. A first orifice is disposed in the casing of the first transaxle so as to branch from the charge passage of the first transaxle at an upstream side of the first charge pressure regulation valve so that fluid passed through the first orifice is supplied to the first port of the first transaxle. The drain passage is referred to as a first drain passage, whereby part of the fluid flowing in the charge passage of the first transaxle is drained to the fluid sump of the second transaxle via the first orifice, the first pipe and the first drain passage.

Therefore, part of the fluid delivered from the charge pump of the first transaxle is passed through the first orifice and is supplied to the first pipe, thereby cooling the entire hydraulic transmission system with no additional charge pump increasing costs. If the first pipe is provided on any intermediate portion thereof with no hydraulic actuator resisting the flow of fluid in the first pipe, the first pipe further surely makes the flow of fluid therein from the first port of the transaxle to the first port of the second transaxle. Even if a hydraulic actuator is disposed on an intermediate portion of the first pipe so as to resist the flow of fluid in the first pipe, and the moved hydraulic actuator reaches a limit position of its movement, the first orifice resists backpressure of fluid from the hydraulic actuator toward the charge passage of the first transaxle, thereby preventing hydraulic pressure in the charge passage of the first transaxle from being suddenly increased by the backpressure from the hydraulic actuator on the first pipe.

Preferably, in the second aspect, the hydraulic transmission system further comprises an external reservoir tank disposed on an intermediate portion of the second pipe.

Therefore, the external reservoir tank absorbs fluid from the overflowing fluid sump of the second transaxle so as to keep the required volume of the fluid sump of the second transaxle while driving the hydraulic pump of the second transaxle, and supplies fluid to the hydraulically depressed fluid sump of the first transaxle so as to keep the required volume of the fluid sump of the first transaxle while driving the hydraulic pump of the first transaxle.

Preferably, in the second aspect, and in the hydraulic transmission system according to a third aspect of the invention, the first transaxle is configured so that fluid passed through the first orifice is fully supplied to the first port of the first transaxle without branching.

Therefore, the part of the fluid delivered from the charge pump of the first transaxle and passed through the first orifice is fully supplied to the first pipe without branching, thereby further efficiently cooling the entire hydraulic transmission system with no additional charge pump increasing costs. If the first pipe is provided on any intermediate portion thereof with no hydraulic actuator resisting the flow of fluid in the first pipe, the first pipe further makes sure fluid flows therein from the first port of the transaxle to the first port of the second transaxle.

Alternatively, in the second aspect, and in the hydraulic transmission system according to a third aspect of the invention, a first hydraulic actuator is disposed on an intermediate portion of the first pipe, and a first switching valve is connected to the first pipe so as to be shiftable between an opened state for making the flow of fluid therethrough bypassing the first hydraulic actuator and a closed state for allowing only the flow of fluid through the first hydraulic actuator.

Therefore, the flow of fluid in the first pipe for cooling the hydraulic transmission system is also used for operating the first hydraulic actuator. The flow of fluid in the first pipe from the first port of the first transaxle to the first port of the second transaxle is ensured without interruption so as to prevent the first orifice from being unexpectedly pressurized by interruption of the flow of fluid in the first pipe because it is allowed to pass the first hydraulic actuator or the first switching valve regardless of whether the first switching valve is opened or closed.

Preferably, in the fourth aspect, the hydraulic transmission system further comprises an actuator pressure regulation valve which is supplied with fluid branching from the flow of fluid between the first orifice and the first port of the first transaxle so as to release fluid to the charge passage of the first transaxle between a connection point of the charge passage of the first transaxle to the first orifice and a connection point of the charge passage of the first transaxle to the first charge pressure regulation valve.

Therefore, especially when the first hydraulic actuator reaches a limit position of its movement, the first hydraulic actuator generates undesirably high backpressure toward the charge pump of the first transaxle, which cannot be completely blocked by the first orifice; however, surplus fluid having the backpressure is released from the actuator pressure regulation valve so as to bypass the first orifice before the backpressure reaches the first orifice, and then the surplus fluid is released from the first charge pressure regulation valve so as to be drained to the fluid sump of the first transaxle, thereby regulating the pressure of fluid to be charged to the hydraulic circuit of the first transaxle in spite of the backpressure generated from the first hydraulic actuator.

Preferably, in the fourth aspect, the hydraulic transmission system according to a fifth aspect of the invention further comprises a pair of third ports, a second charge pressure regulation valve, a second orifice, a third pipe, a second hydraulic actuator, a second switching valve, and a second drain passage. Each of the third ports is provided on the casing of each of the first and second transaxle and is opened outward from the casing of each of the first and second transaxle. The second charge pressure regulation valve is disposed in the casing of the second transaxle and is connected to the charge passage of the second transaxle so as to regulate a pressure of fluid in the charge passage of the second transaxle so that fluid released from the second charge pressure regulation valve is drained to the fluid sump of the second transaxle together with the fluid in the first drain passage. The second orifice is disposed in the casing of the second transaxle so as to branch from the charge passage of the second transaxle at an upstream side of the second charge pressure regulation valve so that fluid passed through the second orifice is supplied to the third port of the second transaxle. The third pipe is interposed between the third ports of the respective first and second transaxles. The second hydraulic actuator is disposed on an intermediate portion of the third pipe. The second switching valve is connected to the third pipe so as to be shiftable between an opened state for making the flow of fluid therethrough bypassing the second hydraulic actuator and a closed state for allowing only the flow of fluid through the second hydraulic actuator. The second drain passage is disposed in the casing of the first transaxle so as to connect the third port of the second transaxle to the fluid sump of the first transaxle, whereby part of the fluid flowing in the charge passage of the second transaxle is drained to the fluid sump of the first transaxle via the second orifice, the third pipe, the second hydraulic actuator and the second drain passage, while the fluid released from the first charge pressure regulation valve is also drained to the fluid sump of the first transaxle.

Therefore, while the first pipe interposed between the first ports of the first and second transaxles makes fluid flow from the first transaxle to the second transaxle, the third pipe interposed between the third ports of the first and second transaxles makes fluid flow from the second transaxle to the first transaxle, thereby promoting fluid circulation between the first and second transaxles for cooling the hydraulic transmission system. The flow of fluid in the third pipe from the second transaxle to the first transaxle is also used for operating the second hydraulic actuator. The flow of fluid in the third pipe from the third port of the second transaxle to the third port of the first transaxle is ensured without interruption so as to prevent the second orifice from being unexpectedly pressurized by interruption of the flow of fluid in the third pipe because it is allowed to pass the second hydraulic actuator or the second switching valve regardless of whether the second switching valve is opened or closed. In this way, the fluid circulation system for the hydraulic transmission system is utilized for operating the two hydraulic actuators.

Preferably, in the fifth aspect, the hydraulic transmission system further comprises an actuator pressure regulation valve which is supplied with fluid branching from the flow of fluid between the second orifice and the third port of the second transaxle so as to release fluid to the charge passage of the second transaxle between a connection point of the charge passage of the second transaxle to the second orifice and a connection point of the charge passage of the second transaxle to the second charge pressure regulation valve.

Therefore, especially when the second hydraulic actuator reaches a limit position of its movement, the second hydraulic actuator generates undesirably high backpressure toward the charge pump of the second transaxle, which cannot be completely blocked by the second orifice; however, surplus fluid having the backpressure is released from the actuator pressure regulation valve so as to bypass the second orifice before the backpressure reaches the second orifice, and then the surplus fluid is released from the second charge pressure regulation valve so as to be drained to the fluid sump of the second transaxle, thereby regulating the pressure of fluid to be charged to the hydraulic circuit of the second transaxle in spite of the backpressure generated from the second hydraulic actuator.

These, further and other objects, features and advantages of the invention will appear more fully from the following detailed description with reference to drawings.

DETAILED DESCRIPTION OF THE INVENTION

Figure 1:
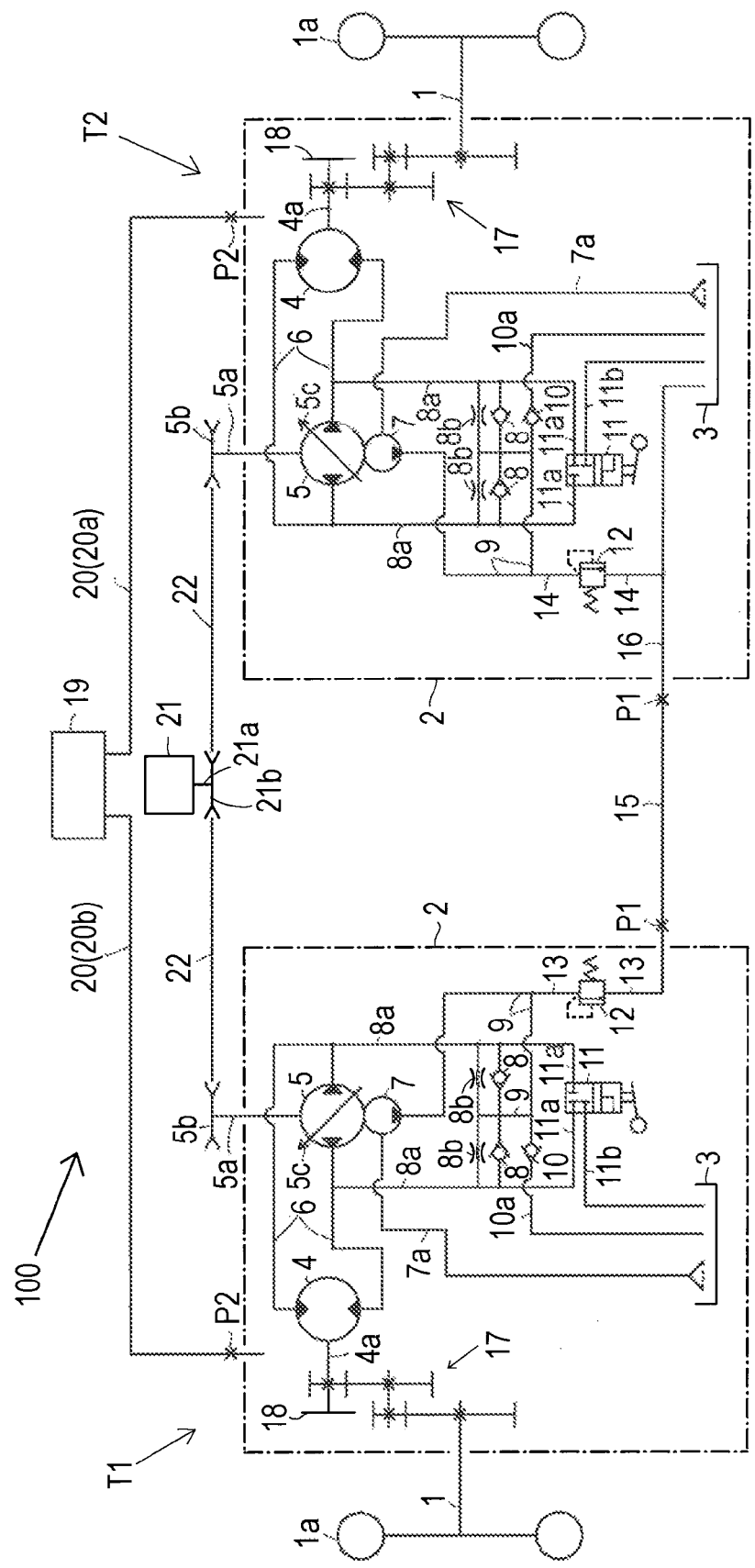
FIG. 1 is a hydraulic circuit diagram of a hydraulic transmission system 100 according to a first embodiment of the invention.

Referring to FIGS. 1 to 5, each of hydraulic transmission systems 100, 200, 300, 400 and 500 is adaptable as a transmission system for a zero-turn vehicle such as a lawn mower.

First, a common structure to hydraulic transmission systems 100, 200, 300, 400 and 500 will be described with reference to FIGS. 1 to 5. Each of hydraulic transmission system 100, 200, 300, 400 and 500 includes a pair of transaxles T1 and T2. Each of transaxles T1 and T2 includes an axle 1 and a casing 2 supporting axle 1. Transaxles T1 and T2 are adapted in a zero-turn vehicle as right and left transaxles so that axles 1 supported by casings 2 of respective transaxles T1 and T2 serve as right and left axles 1 for supporting right and left drive wheels 1a of the vehicle. As detailed later, each of first and second transaxles T1 and T2 has an HST and a charge pump for charging fluid to the HST, first transaxle T1 is defined as draining fluid delivered from its own charge pump to a fluid sump of second transaxle T2, and second transaxle T2 is defined as having the fluid sump to which the fluid delivered from the charge pump of first transaxle T1 and fluid delivered from a charge pump of the second transaxle T2 is drained. Each of transaxles T1 and T2 may serve as either the right transaxle or the left transaxle.

Hereinafter, casing 2 of each of transaxles T1 and T2 is simply referred to as casing 2. A hydraulic motor 4 and a hydraulic pump 5 are disposed in casing 2. Alternatively, hydraulic motor 4 and/or hydraulic pump 5 may be disposed outside of casing 2. Hydraulic motor 4 has a motor shaft 4a, and a reduction gear train 17 is disposed in casing 2 so as to transmit power from motor shaft 4a to axle 1. A brake 18 for braking axle 1 is provided on motor shaft 4a, however, an alternative brake for braking axle 1 may be provided on any portion of a power train between motor shaft 4a and axle 1, including reduction gear train 17.

A hydraulic circuit (hereinafter referred to as HST circuit) 6 is disposed in casing 2 so as to fluidly connect hydraulic pump 5 to hydraulic motor 4. Therefore, in casing 2, a hydrostatic stepless transmission (HST) is configured so as to include hydraulic pump 5, hydraulic motor 4 and HST circuit 6. Hydraulic pump 5 has a pump shaft 5a serving as an input shaft of the HST. Pump shaft 5a projects outward from casing 2 so as to be fixedly provided thereon with a pulley 5b. A zero-turn vehicle equipped with each hydraulic transmission system 100, 200, 300, 400 or 500 is provided with an engine 21. Engine 21 has an engine output shaft 21a, and a pulley 21b is fixed on engine output shaft 21a. Pulleys 5b on pump shafts 5a projecting outward from casings 2 of respective transaxles T1 and T2 are drivingly connected to pulley 21b on engine output shaft 21a via at least one belt 22. Accordingly, hydraulic pumps 5 of first and second transaxles T1 and T2 are driven by engine 21.

Each HST circuit 6 includes a pair of hydraulic fluid passages interposed between hydraulic pump 5 and hydraulic motor 4. Each hydraulic pump 5 is a variable displacement hydraulic pump including a movable swash plate 5c that is tiltable in opposite directions from its neutral position. To rotate axle 1 in a forward traveling direction of the vehicle, movable swash plate 5c of corresponding hydraulic pump 5 is tilted in one direction (referred to as a forward traveling direction) from the neutral position, so as to hydraulically pressurize one hydraulic fluid passage (referred to as a forward traveling passage) of HST circuit 6, and so as to hydraulically depress the other hydraulic fluid passage (referred to as a backward traveling passage) of HST circuit 6. To rotate axle 1 in a backward traveling direction of the vehicle, movable swash plate 5c of corresponding hydraulic pump 5 is tilted in the other direction (referred to as a backward traveling direction) from the neutral position, so as to hydraulically pressurize the backward traveling passage of HST circuit 6, and so as to hydraulically depress the forward traveling passage of HST circuit 6.

A pair of charge check valves 8 are disposed in casing 2. A pair of passages 8a are extended from respective charge check valves 8 and are connected to the respective forward and backward traveling passages of HST circuit 6. When movable swash plate 5c is tilted in the forward traveling direction, the backward traveling passage of HST circuit 6 is hydraulically depressed, and charge check valve 8 connected to the backward traveling passage is opened to allow the flow of fluid to the backward traveling passage. When movable swash plate 5c is tilted in the backward traveling direction, the forward traveling passage of HST circuit 6 is hydraulically depressed, and charge check valve 8 connected to the forward traveling passage is opened to allow the flow of fluid to the forward traveling passage.

A charge pump 7 is disposed in casing 2. Pump shaft 5a also serves as a drive shaft for driving charge pump 7, whereby charge pump 7 is driven together with hydraulic pump 5 by engine 21 so as to suck fluid from a fluid sump 3 in casing 2 via a fluid suction passage 7a, and so as to deliver the fluid to be charged to HST circuit 6 in casing 2. A charge passage 9 is disposed in casing 2. Each charge passage 9 extends from a delivery port of charge pump 7, and bifurcates to respective charge check valves 8 so as to fluidly connect charge pump 7 to the pair of charge check valves 8. Accordingly, fluid delivered from charge pump 7 is charged to HST circuit 6 via charge passage 9 and opened charge check valve 8.

A pair of orifices 8b are disposed in casing 2 so as to connect charge passage 9 to respective passages 8a and so as to bypass respective charge check valves 8. Each orifice 8b serves as a neutral valve for escaping fluid from the corresponding forward or backward traveling passage of HST circuit 6, thereby expanding a neutral zone of the HST.

In casing 2, an auxiliary charge check valve 10 is provided on an auxiliary charge passage 10a connecting charge passage 9 to fluid sump 3. When the vehicle is parked on a slope while stopping engine 21, fluid may escape from HST circuit 6 in each casing 2 via orifices 8b, and the hydraulic pressure of HST circuit 6 may become insufficient to hold stationary wheel 1a, whereby the vehicle may unexpectedly descend the slope. However, stationary engine 21 cannot drive charge pumps 7. Therefore, auxiliary charge check valve 10 is opened by the reduction of hydraulic pressure of HST circuit 6 so as to allow the flow of fluid from fluid sump 3 to HST circuit 6, thereby holding the parked vehicle on a slope.

A manually operable drain valve 11 is disposed in casing 2. A pair of passages 11a are interposed between drain valve 11 and respective passages 8a. A drain passage 11b is extended from drain valve 11 to fluid sump 3. Drain valve 11 is shiftable between a closed position and an opened position. Drain valve 11 is normally set at the closed position so as to isolate passages 12a and drain passage 12b from one another, thereby preventing fluid from being drained from HST circuit 6 to fluid sump 3 via drain passage 11b. When the vehicle is towed, drain valve 11 is set at the opened position, fluid is drained from HST circuit 6 to fluid sump 3 via passages 8a and 11a and drain passage 11b, thereby making wheels 1a free from hydraulic pressure of the respective HSTs.

Each of hydraulic transmission system 100, 200, 300, 400 and 500 is provided with a fluid circulation system including pipes 15 and 20 for circulating fluid between first and second transaxles T1 and T2 so as to cool the entire hydraulic transmission system. In this regard, pipes 15 and 20 are disposed outside of casings 2 of first and second transaxles T1 and T2 so as to circulate fluid between casings 2 of first and second transaxles T1 and T2, thereby radiating heat from fluid flowing in pipes 15 and 20. Each casing 2 has outwardly opened ports P1 and P2. Pipe 15 is interposed between ports P1 of respective first and second transaxles T1 and T2. Pipe 20 is interposed between ports P2 of respective first and second transaxles T1 and T2.

Pipe 15 is defined as receiving part of the fluid delivered from charge pump 7 of first transaxle T1 so as to make the flow of fluid therein from port P1 of first transaxle T1 to port P1 of second transaxle T2. Each port P1, especially port P1 of second transaxle T2, is provided on a lower portion of casing 2 serving as an oil pan that is a bottom portion of fluid sump 3, thereby efficiently collecting fluid in the oil pan.

On the other hand, in each of hydraulic transmission systems 100, 200, 300 and 400, pipe 20 is defined as allowing the flow of fluid therein from port P2 of second transaxle T2 to port P2 of first transaxle T1 so as to correspond to the flow of fluid in pipe 15 from port P1 of first transaxle T1 to port P1 of second transaxle T2. In this regard, the flow of fluid in pipe 15 from first transaxle T1 to second transaxle T2 causes overflow of fluid sump 3 of second transaxle T2 and hydraulic depression of fluid sump 3 of first transaxle T1, thereby generating natural flow of fluid through pipe 20 from port P2 of second transaxle T2 to port P2 of first transaxle T1.

Further, in each of hydraulic transmission systems 100, 200, 300, 400 and 500, pipe 20 is provided on an intermediate portion thereof with an external reservoir tank 19 for promptly absorbing fluid from overflowing fluid sump 3 of any of first and second transaxles T1 and T2 and for promptly supplying fluid to hydraulically depressed fluid sump 3 of any of first and second transaxles T1 and T2, thereby constantly regulating volumes of fluid sumps 3 of first and second transaxles T1 and T2. In other words, pipe 20 is divided into divisional pipes 20a and 20b by external reservoir tank 19. Pipe 20a is interposed between external reservoir tank 19 and port P2 of second transaxle T2. Pipe 20b is interposed between external reservoir tank 19 and port P2 of first transaxle T1.

In this regard, the upper portion of casing 2 having port P2 connected to pipe 20a or 20b is defined so as to be available to receive fluid from overflowing fluid sump 3 in casing 2, and to have suction of fluid to fluid sump 3 in casing 2. Especially, in each of hydraulic transmission systems 100, 200, 300 and 400, the upper portion of casing 2 of second transaxle T2 having port P2 connected to pipe 20a is defined as a portion that can receive overflow of fluid sump 3 whose volume is liable to be increased by collecting fluid delivered from charge pumps 7 of first and second transaxles T1 and T2. The upper portion of casing 2 of first transaxle T1 having port P2 connected to pipe 20b is defined as a portion that is subject to hydraulic depression of fluid sump 3 whose volume is liable to be decreased by suction of fluid to charge pump 7 of first transaxle T1.

Pipe 15 must be a high pressure pipe, e.g., a metal pipe, such as to bear against high-pressurized fluid delivered from charge pump 7 of first transaxle T1 to fluid sump 3 of second transaxle T2. Pipe 20 may be a low pressure pipe, e.g., a rubber hose, because it has to bear against only natural flow of fluid depending on overflow of fluid sump 3 and on hydraulic depression of fluid sump 3. Especially, in each of hydraulic transmission systems 100, 200, 300 and 400, pipe 20a interposed between port P2 of second transaxle T2 and external reservoir tank 19 needs to bear against only a pressure of natural flow of fluid from port P2 of second transaxle T2 caused by overflowing of fluid sump 3 of second transaxle T2, and pipe 20b interposed between port P2 of first transaxle T1 and external reservoir tank 19 needs to bear only a pressure of natural flow of fluid introduced into casing 2 of first transaxle T1 via port P2 of first transaxle T1 according to hydraulic depression of fluid sump 3 of first transaxle T1. In this way, of pipes 15 and 20 constituting the fluid circulation system of each of hydraulic transmission systems 100, 200, 300, 400 and 500, only pipe 15 is the expensive high pressure pipe while pipe 20 is the cheap low pressure pipe, thereby economizing the fluid circulation system.

Referring to FIG. 1, the fluid circulation system of hydraulic transmission system 100 will be described. In casing 2 of first transaxle T1, a relief passage 13 branches from charge passage 9 to port P1, and a charge pressure regulation valve 12 is disposed on relief passage 13. On the other hand, in casing 2 of second transaxle T2, a drain passage 14 branches from charge passage 9 to fluid sump 3, and a charge pressure regulation valve 12 is disposed on drain passage 14. Further, in casing 2 of second transaxle T2, a drain passage 16 is extended from port P1 to fluid sump 3. Therefore, relief passage 13 in casing 2 of first transaxle T1 is connected to fluid sump 3 of second transaxle T2 via ports P1 of first and second transaxles T1 and T2 and drain passage 16 in casing 2 of second transaxle T2.

When engine 21 is driven to drive hydraulic pumps 5 and charge pumps 7 of first and second transaxles T1 and T2, charge pumps 7 deliver fluid into respective charge passages 9 so as to increase hydraulic pressures in charge passages 9 beyond thresholds for closing respective charge pressure regulation valves 12 of first and second transaxles T1 and T2, thereby opening charge pressure regulation valves 12 of first and second transaxles T1 and T2. Opened charge pressure regulation valve 12 of first transaxle T1 releases fluid into relief passage 13. No passage branches from relief passage 13 between charge passage 9 and port P1 in first transaxle T1, so that fluid released from charge pressure regulation valve 12 of first transaxle T1 is fully supplied to port P1 of first transaxle T1 without branching, and the fluid flows from port P1 of first transaxle T1 to fluid sump 3 of second transaxle T2 via pipe 15 and drain passage 16. Opened charge pressure regulation valve 12 also releases fluid to fluid sump 3 of second transaxle T2 via drain passage 14.

Accordingly, part of the fluid delivered from charge pump 7 of first transaxle T1 via opened pressure regulation valve 12 of first transaxle T1 flows to fluid sump 3 of second transaxle T2 via pipe 15 so as to reduce the volume of fluid sump 3 of first transaxle T1 by suction of fluid to charge pump 7 of first transaxle T1, while fluid delivered from charge pumps 7 of first and second transaxles T1 and T2 via opened pressure regulation valves 12 of first and second transaxles T1 and T2 is collected into fluid sump 3 of second transaxle T2 so as to increase the volume of fluid sump 3 of second transaxle T2, whereby fluid sump 3 of second transaxle T2 overflows so as to make the flow of fluid from port P2 of second transaxle T2 to external reservoir tank 19 via pipe 20a, and fluid sump 3 of first transaxle T1 is hydraulically depressed so as to absorb fluid from external reservoir tank 19 via pipe 20b and port P2 of first transaxle T1.

In hydraulic transmission system 100, pipe 15 has no means, such as a hydraulic actuator, causing interruption of the flow of fluid in pipe 15. Therefore, relief passage 13 having charge pressure regulation valve 12 is free from backpressure in pipe 15, which could arise if a means causing interruption of the flow of fluid in pipe 15 were disposed on pipe 15, so that the flow of full fluid released from charge pressure regulation valve 12 of first transaxle T1 to pipe 15 without branching is constantly kept without interruption so as to efficiently cool hydraulic transmission system 100. Further, first transaxle T1 can be simplified because it does not need to have means for protecting its hydraulic components from the backpressure in pipe 15.

Figure 2:
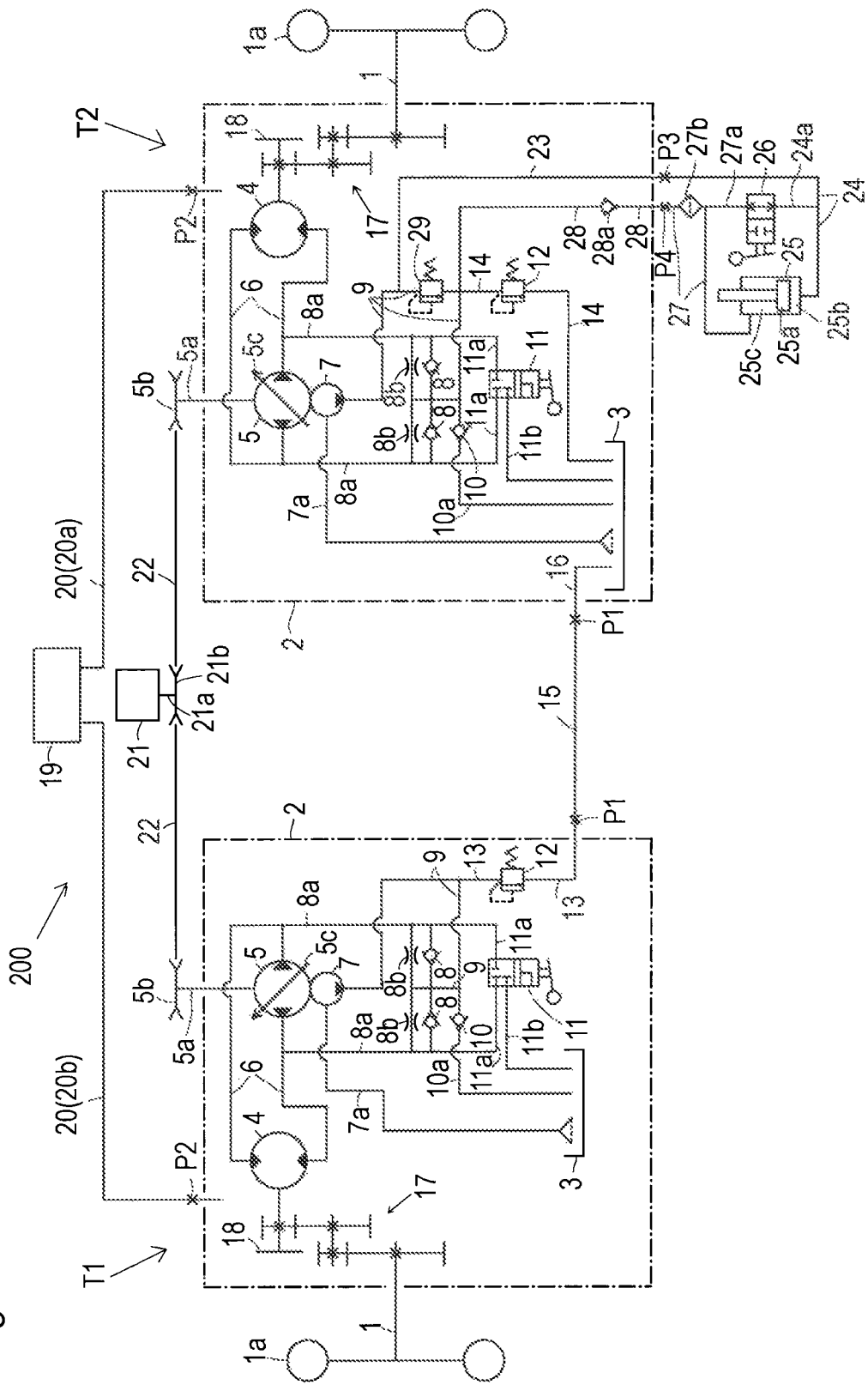
FIG. 2 is a hydraulic circuit diagram of a hydraulic transmission system 200 according to a second embodiment of the invention.

Referring to FIG. 2, the fluid circulation system of hydraulic transmission system 200 will be described. The fluid circulation system of hydraulic transmission system 200 corresponds to that of hydraulic transmission system 100 modified to have a hydraulic actuator circuit utilizing fluid delivered from charge pump 7 of second transaxle T2. Description of components designated by the same reference numerals as those used in FIG. 1 is omitted because they are identical or equivalent to corresponding components designated by the same reference numerals in FIG. 1.

The only difference of hydraulic transmission system 200 from hydraulic transmission system 100 is the hydraulic actuator circuit provided inside and outside of casing 2 of second transaxle T2 so as to use fluid delivered from charge pump 7 of second transaxle T2 in consideration that fluid sump 3 of second transaxle T2 is liable to increase its volume as discussed about hydraulic transmission system 100. In this regard, casing 2 of second transaxle T2 is provided thereon with outwardly opened ports P3 and P4 in addition to ports P1 and P2. Port P3 serves as a fluid extraction port for extracting fluid from casing 2 of second transaxle T2 so as to supply fluid to a hydraulic actuator. Port P4 serves as a fluid returning port for returning fluid into casing 2 of second transaxle T2 so as to discharge fluid from the hydraulic actuator.

In the hydraulic actuator circuit, a hydraulic cylinder 25 serving as a hydraulic actuator is disposed outside of casing 2 of second transaxle T2. For example, if the vehicle equipped with hydraulic transmission system 200 is a lawn mower, hydraulic cylinder 25 is a cylinder for lifting a mower deck incorporating a blade. Hydraulic cylinder 25 is a single-acting cylinder whose inner space is divided by a piston 25a into a first fluid chamber 25b and a second fluid chamber 25c. Hydraulic cylinder 25 has a biasing means, e.g., a spring, for biasing piston 25a to an initial position such as to minimize first fluid chamber 25b and to maximize second fluid chamber 25c. A pipe 24 is disposed outside of casing 2 of second transaxle T2 so as to connect port P3 to first fluid chamber 25b of hydraulic cylinder 25. A pipe 27 is disposed outside of casing 2 of second transaxle T2 so as to connect port P4 to second fluid chamber 25c of hydraulic cylinder 25.

In the hydraulic actuator circuit, a switching valve 26 is disposed outside of second transaxle T2 and is connected to pipe 24 via a bypass passage 24a and to pipe 27 via a bypass passage 27a. Switching valve 26 is shiftable between a closed state and an opened state. When switching valve 26 is set in the closed state, switching valve 26 blocks off between bypass passages 24a and 27a so that fluid flowing from port P3 into pipe 24 is supplied into first fluid chamber 25b, thereby moving piston 25a and discharging fluid from second fluid chamber 25c to port P4 via pipe 27. When switching valve 26 is set in the opened state, switching valve 26 allows fluid to flow between bypass passages 24a and 27a so that fluid extracted from port P3 flows from pipe 24 to pipe 27 via bypass passages 24a and 27a and opened switching valve 26, thereby reducing the hydraulic pressure of first fluid chamber 25b and returning piston 25a to its initial position by the biasing means. In this regard, when piston 25a moves to its initial position, fluid flowing from bypass passage 27a to pipe 27 is supplied to second fluid chamber 25c. Incidentally, a fluid filter 27b is disposed on pipe 27 between bypass passage 27a and port P4.

In casing 2 of second transaxle T2, charge passage 9 has a junction to drain passage 14 having charge pressure regulation valve 12, similar to charge passage 9 of second transaxle T2 in hydraulic transmission system 100. Hereinafter, this junction of charge passage 9 to drain passage 14 at an upstream side of charge pressure regulation valve 12 will be referred to as the "draining junction." The hydraulic actuator circuit includes a fluid extraction passage 23 and a fluid returning passage 28. Fluid extraction passage 23 is disposed in casing 2 of second transaxle T2 so as to connect port P3 to a portion of charge passage 9 of second transaxle T2 at an upstream side of the draining junction. Fluid returning passage 28 is disposed in casing 2 of second transaxle T2 so as to connect port P4 to a portion of charge passage 9 at the draining junction or at an upstream side of the draining junction and at a downstream side of the portion of charge passage 9 connected to fluid extraction passage 23. Therefore, charge pressure regulation valve 12 on drain passage 14 regulates pressure of fluid in charge passage 9 after fluid returns to charge passage 9 via fluid returning passage 28.

A check valve 28a is disposed on fluid returning passage 28 in casing 2 of second transaxle T2 so as to allow only the flow of fluid from port P4 to charge passage 9. Therefore, when piston 25a returns to its initial position by opening switching valve 26 having been closed, the hydraulically depressed second fluid chamber 25c sucks fluid from bypass passage 27a having fluid passed through opened switching valve 26 as well as fluid backflowing from fluid returning passage 28; however, check valve 28a on fluid returning passage 28 is closed to prevent fluid from backflowing from charge passage 9 of second transaxle T2 into pipe 27 so that the fluid supply to second fluid chamber 25c of hydraulic cylinder 25 depends on only fluid in bypass passage 27a via opened switching valve 26. After piston 25a reaches its initial position, the fluid filled in second fluid chamber 25c blocks the flow of fluid from bypass passage 27a to second fluid chamber 25c so that fluid in bypass passage 27a is made to flow to port P4, thereby opening check valve 28a so as to make the flow of fluid from port P4 to charge passage 9 via fluid returning passage 28.

Further, in casing 2 of second transaxle T2, an actuator pressure regulation valve 29 is disposed on charge passage 9 between the portion connected to fluid extraction passage 23 and the portion connected to fluid returning passage 28. Actuator pressure regulation valve 29 is opened by high pressure such as to arise in fluid extraction passage 23 when piston 25a of hydraulic cylinder 25 reaches a limit position of its movement by closing switching valve 26 before switching valve 26 is shifted to the opened state. In other words, actuator pressure regulation valve 29 is opened to supply HST circuit 6 of second transaxle T2 with fluid delivered from charge pump 7 of second transaxle T2 so as to bypass the hydraulic actuator circuit including passages 23 and 28 and pipes 24 and 27 only when such a high pressure arises in fluid extraction passage 23.

More specifically, unless the above-mentioned high pressure arises in fluid extraction passage 23, actuator pressure regulation valve 29 is closed so that fluid delivered from charge pump 7 of second transaxle T2 flows from charge passage 9 to switching valve 26 or hydraulic cylinder 25 via fluid extraction passage 23 and pipe 24, and returns to charge passage 9 from switching valve 26 or hydraulic cylinder 25 via pipe 27 and fluid returning passage 28. In other words, normally, the hydraulic actuator circuit including passages 23 and 28 and pipes 24 and 27 serves as a charge passage for supplying HST circuit 6 of second transaxle T2 with fluid delivered from charge pump 7 of second transaxle T2. Heat is radiated from fluid flowing in pipes 24 and 27 outside of casing 2. Further, the hydraulic actuator circuit increases capacity of fluid in second transaxle T2 so as to absorb the increase of volume of fluid sump 3 of second transaxle T2 caused by the collection of fluid delivered from charge pumps 7 of first and second transaxles T1 and T2 in fluid sump 3 of second transaxle T2.

In this way, hydraulic transmission system 200 is provided with the hydraulic actuator using fluid delivered from charge pump 7 of second transaxle T2, thereby keeping pipe 15 as having no hydraulic actuator causing interruption of the flow of fluid in pipe 15. In other words, relief passage 13 having charge pressure regulation valve 12 is free from backpressure in pipe 15, which could arise if a hydraulic actuator causing interruption of the flow of fluid in pipe 15 were disposed on pipe 15, so that the flow of full fluid released from charge pressure regulation valve 12 of first transaxle T1 to pipe 15 without branching is constantly kept without interruption so as to efficiently cool hydraulic transmission system 200. Further, first transaxle T1 can be simplified because it does not need to have means for protecting its hydraulic components from the backpressure in pipe 15.

Figure 3:
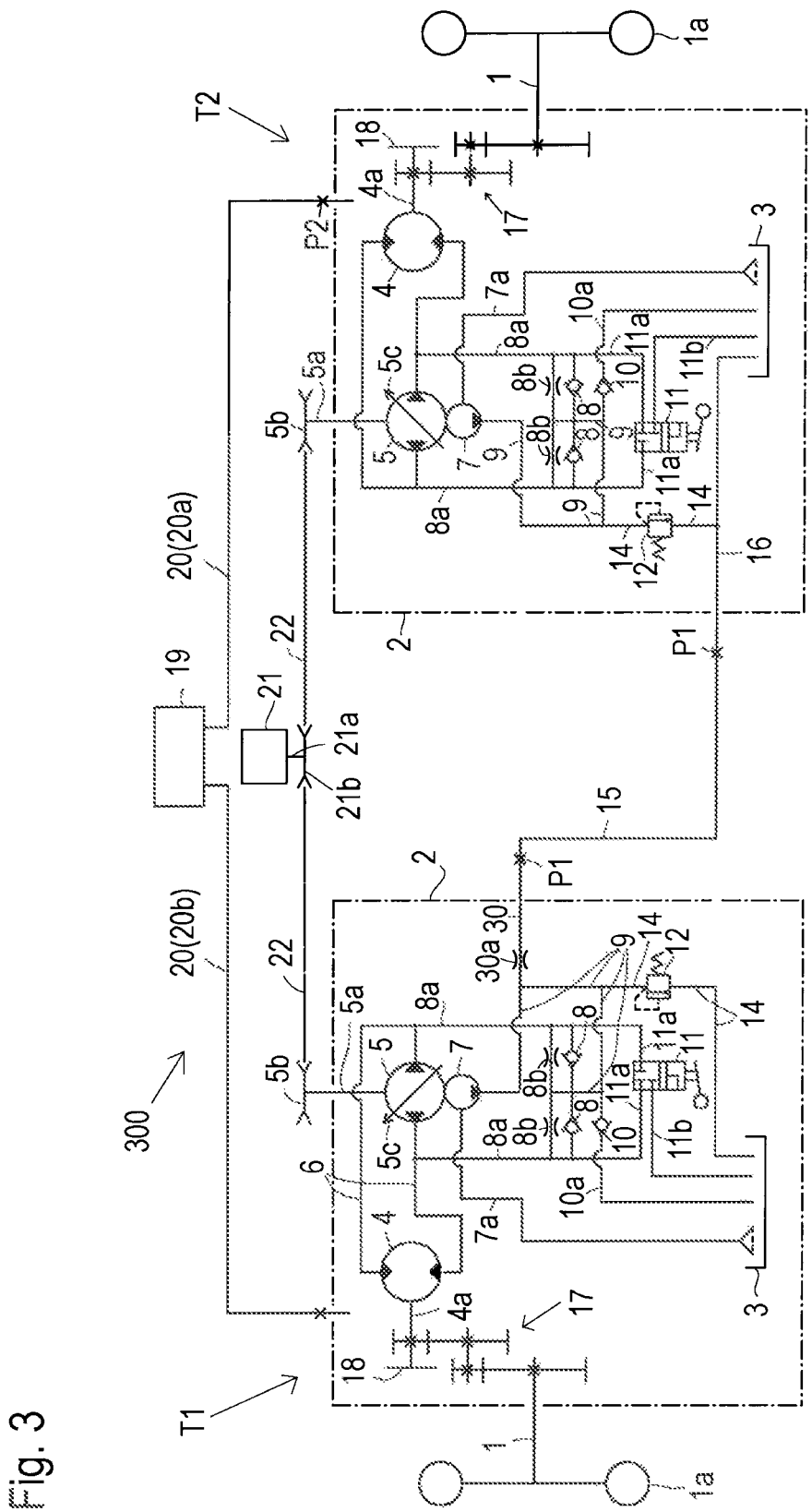
FIG. 3 is a hydraulic circuit diagram of a hydraulic transmission system 300 according to a third embodiment of the invention.

Referring to FIG. 3, the fluid circulation system of hydraulic transmission system 300 will be described. The fluid circulation system of hydraulic transmission system 300 corresponds to that of hydraulic transmission system 100 in which first transaxle T1 is modified to have a different fluid supply from charge pump 7 to port P1. Description of components designated by the same reference numerals as those used in FIG. 1 is omitted because they are identical or equivalent to corresponding components designated by the same reference numerals in FIG. 1.

In casing 2 of first transaxle T1 of hydraulic actuator transmission system 300, a relief passage 30 having an orifice 30a is interposed between charge passage 9 and port P1 so as to replace relief passage 13 having charge pressure regulation valve 12 in first transaxle T1 of hydraulic actuator transmission system 100. Further, in casing 2 of first transaxle T1 of hydraulic actuator transmission system 300, a drain passage 14 having charge pressure regulation valve 12 branches from charge passage 9 at a downstream side of a portion of charge passage 9 connected to relief passage 30 so as to extend to fluid sump 3 of first transaxle T1, similar to drain passage 14 having pressure regulation valve 12 in casing 2 of second transaxle T2.

In first transaxle T1, charge pressure regulation valve 12 is opened by a pressure of fluid in charge passage 9 at the upstream side thereof beyond a threshold so as to release fluid to fluid sump 3 of first transaxle T1, thereby regulating hydraulic pressure of fluid to be charged to HST circuit 6 of first transaxle T1. At the upstream side of charge pressure regulation valve 12, relief passage 30 branches the flow of fluid from charge passage 9, and orifice 30a restricts the branching flow of fluid to be supplied to port P1 of first transaxle T1, thereby regulating the flow rate of fluid in pipe 15. No passage branches from relief passage 30 between orifice 30a and port P1 of first transaxle T1, so that fluid passed through orifice 30a is fully supplied to port P1 without branching, and is drained to fluid sump 3 of second transaxle T2 via pipe 15 and drain passage 16 in casing 2 of second transaxle T2, thereby making the flow of fluid in pipe 15 from first transaxle T1 to second transaxle T2 have a constant rate.

Further, in hydraulic transmission system 300, no means, such as a hydraulic actuator, causing interruption of the flow of fluid in pipe 15 is provided on pipe 15 so that the constant flow rate of fluid from first transaxle T1 to second transaxle T2 is kept without interruption so as to efficiently cool hydraulic transmission system 300. However, first transaxle T1 of hydraulic transmission system 300, which includes relief passage 30 having orifice 30a and includes drain passage 14 having charge pressure regulation valve 12, is prepared to easily correspond to a case where a hydraulic actuator is provided on pipe 15, as discussed in later description of hydraulic transmission systems 400 and 500.

Figure 4:
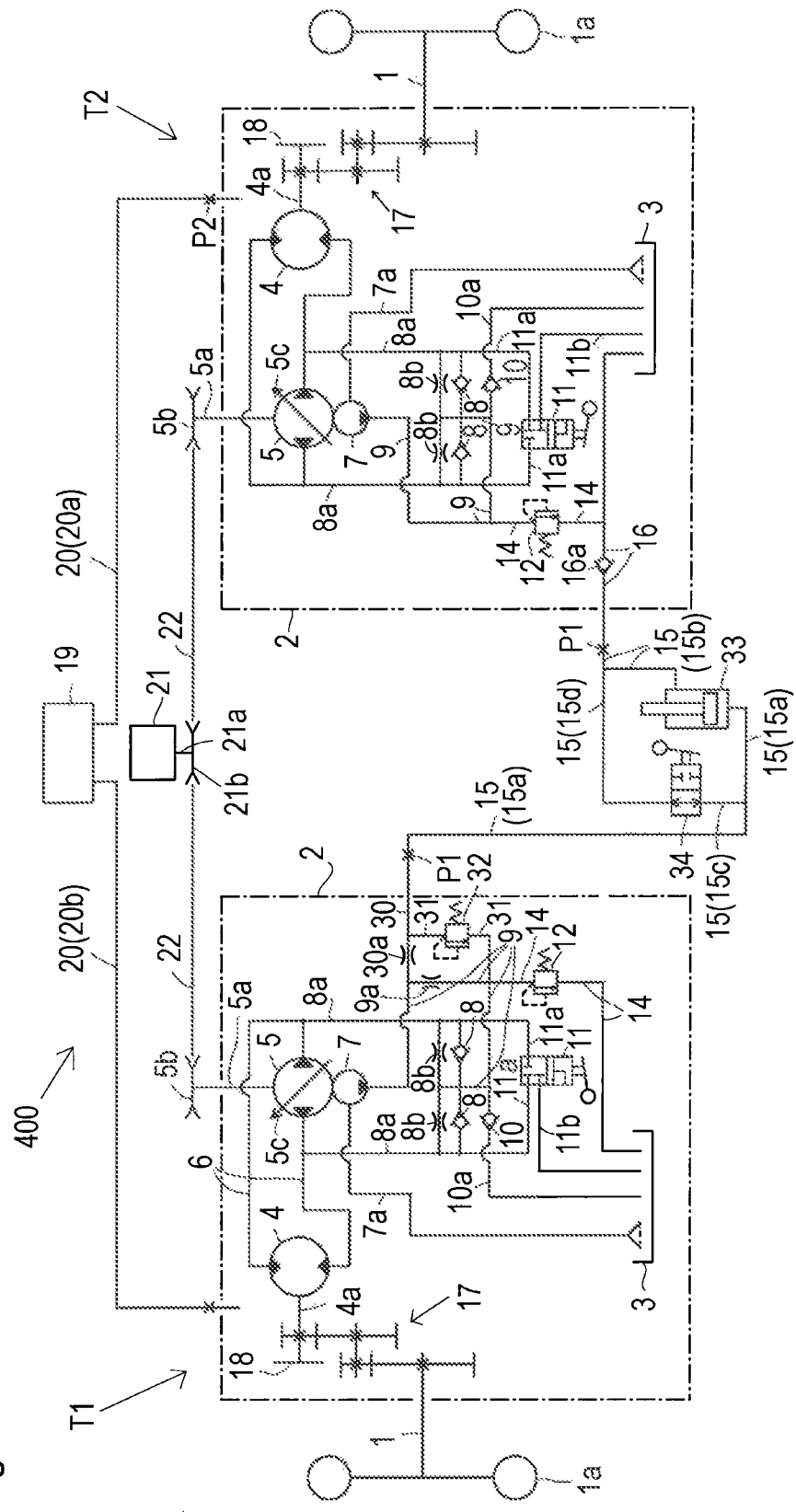
FIG. 4 is a hydraulic circuit diagram of a hydraulic transmission system 400 according to a fourth embodiment of the invention.

Referring to FIG. 4, the fluid circulation system of hydraulic transmission system 400 will be described. The fluid circulation system of hydraulic transmission system 400 corresponds to that of hydraulic transmission system 300 modified to have a hydraulic cylinder 33 serving as a hydraulic actuator on an intermediate portion of pipe 15. Description of components designated by the same reference numerals as those used in FIG. 3 is omitted because they are identical or equivalent to corresponding components designated by the same reference numerals in FIG. 3.

Hydraulic cylinder 33 is a single-acting hydraulic cylinder having a piston dividing the inner space of hydraulic cylinder 33 to two fluid chambers, similar to hydraulic cylinder 25 in hydraulic transmission system 200. Pipe 15 is divided by hydraulic cylinder 33 into divisional pipes 15a and 15b. Pipe 15a is interposed between one fluid chamber of hydraulic cylinder 33 and port P1 of first transaxle T1. Pipe 15b is interposed between the other fluid chamber of hydraulic cylinder 33 and port P1 of second transaxle T2. Pipe 15 further has bypass passages 15c and 15d. Similar to switching valve 26 connected to pipes 24 and 27 in hydraulic transmission system 200, a switching valve 34 is connected to pipe 15a via bypass passage 15c, and to pipe 15b via bypass passage 15d. Switching valve 34 is shiftable between a closed state and an opened state. Closed switching valve 34 blocks off between bypass passages 15c and 15d so as to make the flow of fluid in pipe 15a from port P1 of first transaxle T1 to one fluid chamber of hydraulic cylinder 33 and to make the flow of fluid in pipe 15b from the other fluid chamber of hydraulic cylinder 33 to port P1 of second transaxle T2. Opened switching valve 34 makes the flow of fluid therethrough between bypass passages 15c and 15d so as to bypass hydraulic cylinder 33.

Similar to charge passage 9 of second transaxle T2 as discussed in the description of hydraulic transmission system 200, the junction of charge passage 9 of first transaxle T1 to drain passage 14 at an upstream side of charge pressure regulation valve 12 is referred to as the "draining junction." In casing 2 of first transaxle T1, a bypass passage 31 having an actuator pressure regulation valve 32 branches from relief passage 30 between orifice 30a and port P1 of first transaxle T1, and extends to a portion of charge passage 9 at the draining junction or at an upstream side of the draining junction and at a downstream side of a portion connected to relief passage 30. Incidentally, charge passage 9 has an orifice 9a between the portion connected to relief passage 30 and the portion connected to bypass passage 31.

On the other hand, in casing 2 of second transaxle T2, a check valve 16a is provided on drain passage 16 at an upstream side of a portion, where fluid in drain passage 16 is joined with fluid released from charge pressure regulation valve 12 on drain passage 14 of second transaxle T2, so as to allow only the flow of fluid to fluid sump 3 of second transaxle T2, thereby preventing flow from backflowing from drain passage 14 and fluid sump 3 in second transaxle T2 into pipe 15 so that the fluid supply to hydraulic cylinder 33 for returning a piston of hydraulic cylinder 33 to an initial position depends only on the fluid in bypass passage 15d when switching valve 34, having been closed, is opened, similar to check valve 28a of hydraulic transmission system 200 for preventing the backflow of fluid from fluid returning passage 28 to pipe 27 when switching valve 26, having been closed, is opened to supply fluid to second fluid chamber 25c of hydraulic cylinder 25.

Fluid delivered from charge pump 7 of first transaxle T1 bifurcates between orifices 30a and 9a. Normally, actuator pressure regulation valve 32 is closed so that fluid passed through orifice 30a is fully supplied to pipe 15, thereby efficiently cooling fluid flowing in pipe 15, and thereby smoothly operating the piston of hydraulic cylinder 33 when switching valve 34 is closed. In this regard, in casing 2 of second transaxle T2, check valve 16a is opened to allow the flow of fluid from hydraulic cylinder 33 or switching valve 34 to fluid sump 3 of second transaxle T2 via pipe 15.

When the piston of hydraulic cylinder 33 reaches a limit position of its movement by closing switching valve 34 before switching valve 34 is shifted to the opened state, a high backpressure arises in pipe 15 and relief passage 30. The backpressure is applied in relief passage 30 toward charge passage 9 of first transaxle T1. Orifice 30a restricts fluid having the backpressure so as to considerably protect charge passage 9 of first transaxle T1 from fluid having the backpressure. Further, actuator pressure regulation valve 32 is opened by the high backpressure in relief passage 30 to release fluid from relief passage 30 to charge passage 9 via bypass passage 31 so as to bypass orifice 9a on charge passage 9, thereby further protecting charge passage 9 of first transaxle T1 from the backpressure from hydraulic cylinder 33 via pipe 15 and relief passage 30.

Afterward, when switching valve 34, having been closed, is opened to return the piston of hydraulic cylinder 33 to the initial position, fluid in pipe 15a flows into bypass passage 15c, passes opened switching valve 34, and is introduced from bypass passage 15d to hydraulic cylinder 33; meanwhile, check valve 16a is closed to prevent backflow of fluid from charge passage 9 and fluid sump 3 in second transaxle T2 to pipe 15. After the piston of hydraulic cylinder 33 reaches its initial position, check valve 16a is opened to allow the flow of fluid from pipe 15 to fluid sump 3 of second transaxle T2, as the above-mentioned normal state.

Figure 5:
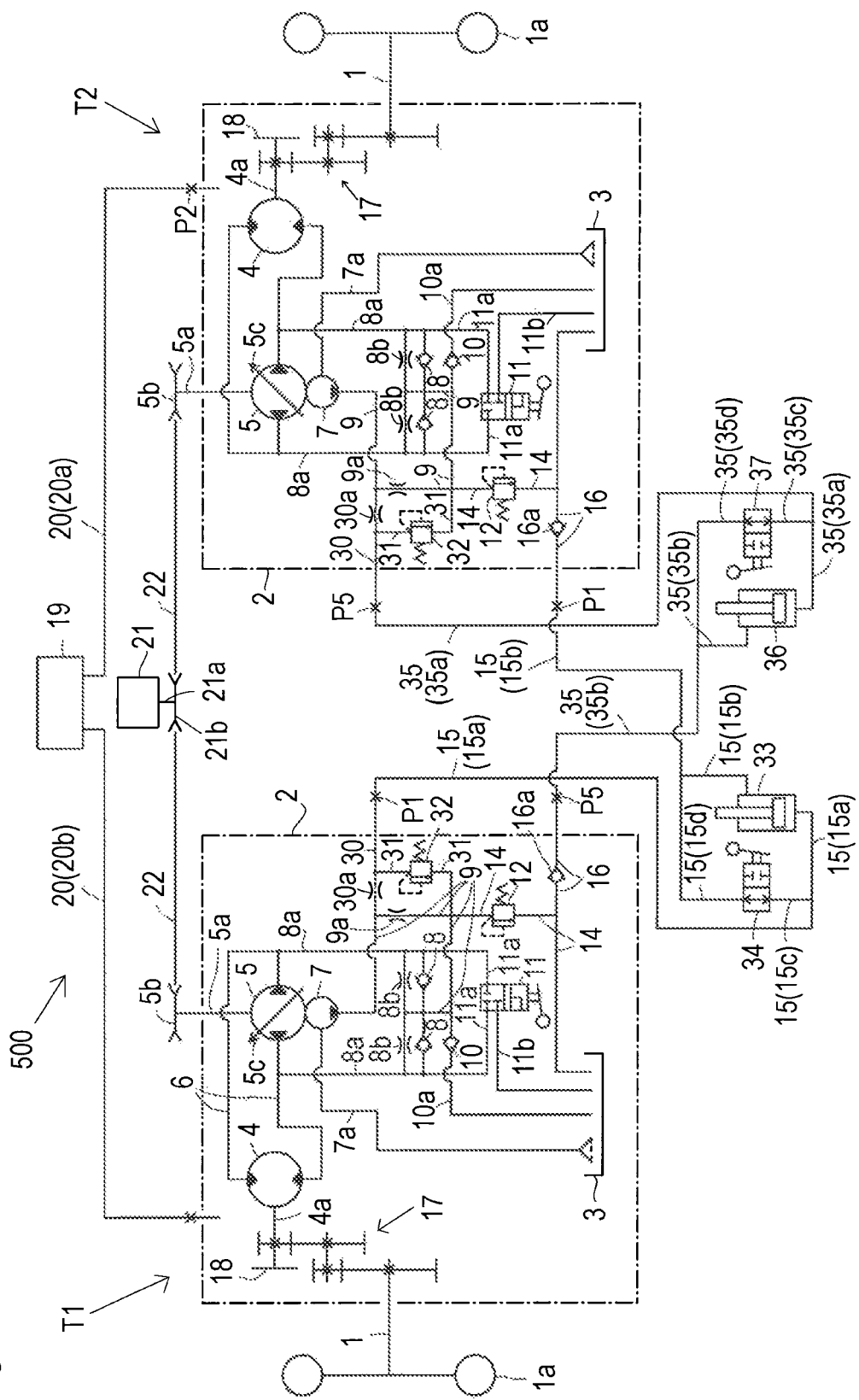
FIG. 5 is a hydraulic circuit diagram of a hydraulic transmission system 500 according to a fifth embodiment of the invention.

Referring to FIG. 5, the fluid circulation system of hydraulic transmission system 500 will be described. The fluid circulation system of hydraulic transmission system 500 corresponds to that of hydraulic transmission system 400 modified to have an additional pipe 35 for making the flow of fluid from second transaxle T2 to first transaxle T1 and to have an additional hydraulic cylinder 36 serving as a hydraulic actuator on an intermediate portion of pipe 35. Description of components designated by the same reference numerals as those used in FIG. 4 is omitted because they are identical or equivalent to corresponding components designated by the same reference numerals in FIG. 4.

In hydraulic transmission system 500, casing 2 of each of first and second transaxles T1 and T2 has a port P5 in addition to port P1 and P2, and pipe 35 is disposed outside of casings 2 and is interposed between ports P5 of first and second transaxles T1 and T2. Pipe 35 is a high pressure pipe such as a metal pipe, similar to pipe 15. Hydraulic cylinder 36 is a single-acting hydraulic cylinder having a piston dividing the inner space of hydraulic cylinder 36 to two fluid chambers, similar to hydraulic cylinder 33. Pipe 35 is divided by hydraulic cylinder 36 into divisional pipes 35a and 35b. Pipe 35a is interposed between one fluid chamber of hydraulic cylinder 36 and port P5 of second transaxle T2. Pipe 35b is interposed between the other fluid chamber of hydraulic cylinder 36 and port P5 of first transaxle T1. Pipe 35 further has bypass passages 35c and 35d. Similar to switching valve 34, a switching valve 37 is connected to pipe 35a via bypass passage 35c, and to pipe 35b via bypass passage 35d, and is shiftable between a closed state and an opened state.

In casing 2 of second transaxle T2, a relief passage 30 having an orifice 30a branches from charge passage 9 at an upstream side of charge pressure regulation valve 12 of second transaxle T2, and extends to port P5 of second transaxle T2, similar to relief passage 30 having orifice 30a interposed between charge passage 9 and port P1 in first transaxle T1. Further, in casing 2 of second transaxle T2, a bypass passage 31 having an actuator pressure regulation valve 32 branches from relief passage 30 between orifice 30a and port P5 of second transaxle T2, and extends to charge passage 9 of second transaxle T2 at an upstream side of charge pressure regulation valve 12 of second transaxle T2 (at the "draining junction" of charge passage 9 joined to drain passage 14 or at an upstream side of the draining junction) and at the downstream side of a portion connected to relief passage 30, similar to bypass passage 31 having actuator pressure regulation valve 32 in casing 2 of first transaxle T1. Charge passage 9 has an orifice 9a between the portion connected to relief passage 30 and the portion connected to bypass passage 31. On the other hand, in casing 2 of first transaxle T1, a check valve 16a is provided on drain passage 16 so as to allow only the flow of fluid from pipe 35 to fluid sump 3 of first transaxle T1 and so as to prevent backflow of fluid from charge passage 9 and fluid sump 3 in first transaxle T1 to pipe 35, similar to check valve 16a on drain passage 16 in casing 2 of second transaxle T2.

In this way, the fluid circulation system of hydraulic transmission system 500 is configured so that, due to the delivery of fluid from charge pumps 7 of first and second transaxles T1 and T2, fluid flows in pipe 15 from first transaxle T1 to second transaxle T2, and flows in pipe 35 from second transaxle T2 to first transaxle T1, thereby further promoting radiation of heat from fluid while flowing in pipes 15 and 35, and thereby further efficiently cooling entire hydraulic transmission system 500. Further, two pipes 15 and 35 that are high pressure pipes are used for respective hydraulic cylinders 33 and 36 serving as two hydraulic actuators, so as to ensure required operability of the two hydraulic actuators.

In each of above-mentioned hydraulic transmission systems 100, 200, 300 and 400, due to pipe 15, fluid sump 3 in second transaxle T2 is assumed to overflow, and fluid sump 3 in first transaxle T1 is assumed to be hydraulically depressed, so that pipe 20 is assumed to make the flow of fluid from port P2 of second transaxle T2 having overflowing fluid sump 3 to port P2 of first transaxle T1 having hydraulically depressed fluid sump 3. On the contrary, in hydraulic transmission system 500, it is not settled whether fluid sump 3 of first or second transaxle T1 or T2 is liable to overflow and whether fluid sump 3 of first or second transaxle T1 or T2 is liable to be hydraulically depressed or not. Due to various driving states of first and second transaxles T1 and T2 and various operation states of hydraulic cylinders 33 and 36, sometimes pipe 20 leads fluid from overflowing fluid sump 3 of second transaxle T2 to hydraulically depressed fluid sump 3 of first transaxle T1, and sometimes from overflowing fluid sump 3 of first transaxle T1 to hydraulically depressed fluid sump 3 of second transaxle T2. Therefore, port P2 of casing 2 that is used for either first transaxle T1 or second transaxle T2 is available for both introduction of fluid from pipe 20 into casing 2 and overflow of fluid sump 3 in casing 2 to pipe 20, and external reservoir tank 19 is available for absorbing fluid from fluid sump 3 of either first or second transaxle T1 or T2 and for supplying fluid to fluid sump 3 of either first or second transaxle T1 or T2.

It is further understood by those skilled in the art that the foregoing description is a preferred embodiment of the disclosed apparatus and that various changes and modifications may be made in the invention without departing from the scope thereof defined by the following claims.

What is claimed is:

1. A hydraulic transmission system for a zero-turn vehicle, comprising:
   first and second transaxles each of which includes:
      an axle,
      a casing supporting the axle,
      a fluid sump provided in the casing,
      first and second ports provided on the casing and opened outward from the casing,
      a hydraulic motor for driving the axle,
      a hydraulic pump for delivering fluid to the hydraulic motor,
      a hydraulic circuit disposed in the casing to fluidly connect the hydraulic pump to the hydraulic motor,
      a charge pump disposed in the casing so as to suck fluid from the fluid sump and so as to deliver fluid to be charged to the hydraulic circuit, and
      a charge passage disposed in the casing so as to supply the hydraulic circuit with fluid delivered from the charge pump;
   a charge pressure regulation valve disposed in the casing of the first transaxle and connected to the charge passage of the first transaxle so as to regulate a pressure of fluid in the charge passage of the first transaxle so that fluid released from the charge pressure regulation valve is fully supplied to the first port of the first transaxle without branching;
   a first pipe disposed outside of the casings of the first and second transaxles so as to connect the first ports of the respective first and second transaxles to each other;
   a drain passage disposed in the casing of the second transaxle so as to connect the first port of the second transaxle to the fluid sump of the second transaxle, whereby part of the fluid flowing in the charge passage of the first transaxle is drained to the fluid sump of the second transaxle via the charge pressure regulation valve, the first pipe and the drain passage; and
   a second pipe disposed outside of the casings of the first and second transaxles so as to connect the second ports of the respective first and second transaxles to each other, whereby overflowing fluid of the fluid sump of the second transaxle is released to the fluid sump of the first transaxle via the second pipe.

2. The hydraulic transmission system according to claim 1, further comprising:
   an external reservoir tank disposed on an intermediate portion of the second pipe.

3. The hydraulic transmission system according to claim 1, further comprising:
   third and fourth ports provided on the casing of the second transaxle and opened outward from the casing of the second transaxle;
   a hydraulic actuator disposed outside of the casing of the second transaxle;
   a third pipe disposed outside of the casing of the second transaxle so as to connect the third port to the hydraulic actuator and so as to lead fluid supplied to the hydraulic actuator;
   a fourth pipe disposed outside of the casing of the second transaxle so as to connect the fourth port to the hydraulic actuator and so as to lead fluid discharged from the hydraulic actuator;
   a switching valve interposed between the third and fourth pipes so as to be shiftable for selecting whether or not fluid delivered from the charge pump of the second transaxle is supplied to the hydraulic actuator;
   an actuator pressure regulation valve disposed on an intermediate portion of the charge passage of the second transaxle;
   a fluid extraction passage disposed in the casing of the second transaxle so as to be interposed between a portion of the charge passage of the second transaxle at an upstream side of the actuator pressure regulation valve and the third port, whereby part of the fluid delivered from the charge pump of the second transaxle before passing the actuator pressure regulation valve is supplied to the hydraulic actuator via the fluid extraction passage and the third pipe; and
   a fluid returning passage disposed in the casing of the second transaxle so as to be interposed between a portion of the charge passage of the second transaxle at a downstream side of the actuator pressure regulation valve and the fourth port, whereby fluid discharged from the hydraulic actuator is returned via the fourth pipe and the fluid returning passage so as to be joined with fluid in the charge passage of the second transaxle after passing the actuator pressure regulation valve.

4. A hydraulic transmission system for a zero-turn vehicle, comprising:
first and second transaxles each of which includes:
an axle,
a casing supporting the axle,
a fluid sump provided in the casing,
first and second ports provided on the casing and opened outward from the casing,
a hydraulic motor for driving the axle,
a hydraulic pump for delivering fluid to the hydraulic motor,
a hydraulic circuit disposed in the casing to fluidly connect the hydraulic pump to the hydraulic motor,
a charge pump disposed in the casing so as to suck fluid from the fluid sump and so as to deliver fluid to be charged to the hydraulic circuit, and
a charge passage disposed in the casing so as to supply the hydraulic circuit with fluid delivered from the charge pump;
a first charge pressure regulation valve disposed in the casing of the first transaxle and connected to the charge passage of the first transaxle so as to regulate a pressure of fluid in the charge passage of the first transaxle, wherein the first transaxle is configured so that fluid released from the first charge pressure regulation valve is drained to the fluid sump of the first transaxle;
a first orifice disposed in the casing of the first transaxle so as to branch from the charge passage of the first transaxle at an upstream side of the first charge pressure regulation valve so that fluid passed through the first orifice is supplied to the first port of the first transaxle;
a first pipe disposed outside of the casings of the first and second transaxles so as to connect the first ports of the respective first and second transaxles to each other;
a first drain passage disposed in the casing of the second transaxle so as to connect the first port of the second transaxle to the fluid sump of the second transaxle, whereby part of the fluid flowing in the charge passage of the first transaxle is drained to the fluid sump of the second transaxle via the first orifice, the first pipe and the first drain passage; and
a second pipe disposed outside of the casings of the first and second transaxles so as to connect the second ports of the respective first and second transaxles to each other, whereby overflowing fluid of the fluid sump of the second transaxle is released to the fluid sump of the first transaxle via the second pipe.

5. The hydraulic transmission system according to claim 4, further comprising:
an external reservoir tank disposed on an intermediate portion of the second pipe.

6. The hydraulic transmission system according to claim 4, wherein the first transaxle is configured so that fluid passed through the first orifice is fully supplied to the first port of the first transaxle without branching.

7. The hydraulic transmission system according to claim 4, further comprising:
a first hydraulic actuator disposed on an intermediate portion of the first pipe; and
a first switching valve connected to the first pipe so as to be shiftable between an opened state for making the flow of fluid therethrough bypassing the first hydraulic actuator and a closed state for allowing only the flow of fluid through the first hydraulic actuator.

8. The hydraulic transmission system according to claim 7, further comprising:
an actuator pressure regulation valve which is supplied with fluid branching from the flow of fluid between the first orifice and the first port of the first transaxle so as to release fluid to the charge passage of the first transaxle between a connection point of the charge passage of the first transaxle to the first orifice and a connection point of the charge passage of the first transaxle to the first charge pressure regulation valve.

9. The hydraulic transmission system according to claim 7, further comprising:
a pair of third ports each of which is provided on the casing of each of the first and second transaxle and opened outward from the casing of each of the first and second transaxle;
a second charge pressure regulation valve disposed in the casing of the second transaxle and connected to the charge passage of the second transaxle so as to regulate a pressure of fluid in the charge passage of the second transaxle so that fluid released from the second charge pressure regulation valve is drained to the fluid sump of the second transaxle together with the fluid in the first drain passage;
a second orifice disposed in the casing of the second transaxle so as to branch from the charge passage of the second transaxle at an upstream side of the second charge pressure regulation valve so that fluid passed through the second orifice is supplied to the third port of the second transaxle;
a third pipe interposed between the third ports of the respective first and second transaxles;
a second hydraulic actuator disposed on an intermediate portion of the third pipe;
a second switching valve connected to the third pipe so as to be shiftable between an opened state for making the flow of fluid therethrough bypassing the second hydraulic actuator and a closed state for allowing only the flow of fluid through the second actuator; and
a second drain passage disposed in the casing of the first transaxle so as to connect the third port of the second transaxle to the fluid sump of the first transaxle, whereby part of the fluid flowing in the charge passage of the second transaxle is drained to the fluid sump of the first transaxle via the second orifice, the third pipe, the second hydraulic actuator and the second drain passage, while the fluid released from the first charge pressure regulation valve is also drained to the fluid sump of the first transaxle.

10. The hydraulic transmission system according to claim 9, further comprising:
an actuator pressure regulation valve which is supplied with fluid branching from the flow of fluid between the second orifice and the third port of the second transaxle so as to release fluid to the charge passage of the second transaxle between a connection point of the charge passage of the second transaxle to the second orifice and a connection point of the charge passage of the second transaxle to the second charge pressure regulation valve.

* * * * *